(12) United States Patent
Rouyer et al.

(10) Patent No.: US 8,199,636 B1
(45) Date of Patent: Jun. 12, 2012

(54) BRIDGED NETWORK SYSTEM WITH TRAFFIC RESILIENCY UPON LINK FAILURE

(75) Inventors: Jessy Rouyer, Addison, TX (US);
Girish Chiruvolu, Plano, TX (US);
Ljubisa Tancevski, Dallas, TX (US)

(73) Assignee: Alcatel Lucent, Paris (FR)

( * ) Notice: Subject to any disclaimer, the term of this patent is extended or adjusted under 35 U.S.C. 154(b) by 1064 days.

(21) Appl. No.: 10/674,220

(22) Filed: Sep. 29, 2003

Related U.S. Application Data

(60) Provisional application No. 60/419,756, filed on Oct. 18, 2002.

(51) Int. Cl.
*G01R 31/08* (2006.01)
*H04L 12/28* (2006.01)
*H04L 12/56* (2006.01)
*G06F 15/173* (2006.01)

(52) U.S. Cl. .................. 370/218; 370/401; 709/239
(58) Field of Classification Search .............. 370/217, 370/223, 225, 242, 401
See application file for complete search history.

(56) References Cited

U.S. PATENT DOCUMENTS

| | | | | |
|---|---|---|---|---|
| 5,253,248 | A * | 10/1993 | Dravida et al. | 370/228 |
| 5,796,740 | A * | 8/1998 | Perlman et al. | 370/401 |
| 6,147,966 | A * | 11/2000 | Johnson et al. | 370/221 |
| 6,154,448 | A * | 11/2000 | Petersen et al. | 370/248 |
| 6,163,525 | A * | 12/2000 | Bentall et al. | 370/228 |
| 6,178,178 | B1 * | 1/2001 | Wallace et al. | 370/465 |
| 6,324,162 | B1 * | 11/2001 | Chaudhuri | 370/225 |
| 6,496,476 | B1 * | 12/2002 | Badt et al. | 370/228 |
| 6,728,205 | B1 * | 4/2004 | Finn et al. | 370/217 |
| 6,898,189 | B1 * | 5/2005 | Di Benedetto et al. | 370/256 |
| 6,914,905 | B1 * | 7/2005 | Yip et al. | 370/395.53 |
| 6,915,445 | B2 * | 7/2005 | Navar et al. | 714/4 |
| 6,950,431 | B1 * | 9/2005 | Nozaki et al. | 370/390 |
| 6,970,417 | B1 * | 11/2005 | Doverspike et al. | 370/216 |

(Continued)

OTHER PUBLICATIONS

S. Shah & M. Yip; "Ethernet Automatic Protection Switching (EAPS), Version 1"; Dec. 11, 2002; Network Working Group; Internet Draft; Extreme Networks.

(Continued)

*Primary Examiner* — Andrew Chriss
(74) *Attorney, Agent, or Firm* — Garlick & Markison; Holly L. Rudnick

(57) ABSTRACT

A bridged network system (10, 10') is described comprising a plurality of nodes ($N_1$-$N_7$). Each node in the plurality of nodes is coupled to communicate with at least one other node in the plurality of nodes. The plurality of nodes comprise a bridge network between external nodes located externally from the plurality of nodes. Each node of the plurality of nodes is operable to perform the steps of receiving a packet (20, 20'), wherein the packet comprises a route indicator field, and responsive to the packet being received prior to a time of failure along a communication link between two of the plurality of nodes, transmitting the packet along a first route in the system to another node in the plurality of nodes. Conversely, each node of the plurality of nodes is also operable to perform the step of, responsive to the packet being received after a time of failure along a communication link between two of the plurality of nodes and in response to the route indicator field, transmitting the packet along a second route in the system to another node in the plurality of nodes, wherein the second route differs from the first route and is identified prior to the time of failure.

20 Claims, 2 Drawing Sheets

U.S. PATENT DOCUMENTS

| | | | | |
|---|---|---|---|---|
| 7,002,917 | B1 * | 2/2006 | Saleh | 370/238 |
| 7,031,321 | B2 * | 4/2006 | Habetha | 370/395.31 |
| 7,042,837 | B1 * | 5/2006 | Cassiday et al. | 370/225 |
| 7,061,876 | B2 * | 6/2006 | Ambe | 370/256 |
| 7,188,280 | B2 * | 3/2007 | Shinomiya et al. | 714/43 |
| 7,197,008 | B1 * | 3/2007 | Shabtay et al. | 370/218 |
| 7,680,031 | B1 * | 3/2010 | Luft et al. | 370/222 |
| 2001/0048660 | A1 * | 12/2001 | Saleh et al. | 370/216 |
| 2002/0038379 | A1 * | 3/2002 | Sato et al. | 709/238 |
| 2003/0117950 | A1 * | 6/2003 | Huang | 370/220 |
| 2003/0154315 | A1 * | 8/2003 | Sultan et al. | 709/251 |
| 2003/0179700 | A1 * | 9/2003 | Saleh et al. | 370/216 |
| 2003/0223358 | A1 * | 12/2003 | Rigby et al. | 370/218 |
| 2005/0122899 | A1 * | 6/2005 | DeBoer et al. | 370/222 |

OTHER PUBLICATIONS

"Redundant Trees for Preplanned Recovery in Arbitrary Vertex-Redundant or Edge-Redundant Graphs;" Muriel Medard, Steven G. Finn, Richard A. Barry, Robert G. Gallager; IEEE/ACM Transactions on Networking, vol. 7, No. 5, Oct. 1999; pp. 641-652.

* cited by examiner

BRIDGED NETWORK SYSTEM WITH TRAFFIC RESILIENCY UPON LINK FAILURE

CROSS-REFERENCES TO RELATED APPLICATIONS

This application claims the benefit, under 35 U.S.C. §119 (e)(1), of U.S. Provisional Application No. 60/419,756, filed Oct. 18, 2002, and incorporated herein by this reference.

STATEMENT REGARDING FEDERALLY SPONSORED RESEARCH OR DEVELOPMENT

Not Applicable.

BACKGROUND OF THE INVENTION

The present embodiments relate to computer networks and are more particularly directed to a bridged network system in which traffic resiliency is provided by quickly switching traffic to a pre-identified route upon a link failure.

A bridged network is one type of network that has found favor in various applications in the networking industry, and for various reasons. A bridged network in many approaches is based on Ethernet switches that are Layer 2 switches, and the basic principle of operation of such a network includes learning of MAC addresses, broadcasting of unknown MAC addresses, and use of a Spanning Tree Protocol to provide loop-free operation. With Ethernet used as a technology in a bridged network, it is a widely used and cost effective medium with numerous interfaces and capable of communications at various speeds up to the Gbps range. With the use of such networks, mechanisms for routing and re-routing traffic have evolved in the instance of a communication failure between bridged network nodes. In this context and throughout this document, the term "node" includes what are referred to in the art as switches or bridges and is known as a device for communicating a block of data. The data block is often referred to as a packet or frame and it is transmitted in the bridged network from one node to another node that is connected to the transmitting node via a physical line referred to as the link and according to a protocol. One common protocol that is particularly used to provide loop-free operation and resilience is the spanning tree protocol, with a specific type of that protocol being known as the rapid spanning tree protocol ("RSTP"). The RSTP provides various aspects, where one is to provide a so-called spanning tree along which data packets pass. The spanning tree is logically defined to include a root node that transmits via logical links to other intermediate nodes and ultimately to an endpoint node. In the spanning tree configuration, if there is a failure along the tree then the RSTP provides communications among the various nodes so as to "re-converge" to a new spanning tree (i.e., a new different set of logical links), and thereafter traffic is routed according to the new spanning tree. Each spanning tree in the prior art has the characteristic that it prevents loops from occurring in response to broadcast transmissions, that is, it breaks what otherwise could be a loop in transmissions and thereby prevents a same node from receiving duplicate packets along different links in the same network.

While the spanning tree protocol has proven beneficial in some implementations, it also may provide certain drawbacks. For example, the RSTP may be relatively slow to re-converge to a new tree following a failure because the protocol relies on exchange of bridge protocol data units ("BPDUs") between the nodes and the root. Hence, depending on the topology, fast re-convergence may not be possible and the re-convergence times can take up to two to three seconds. For some applications this is not an acceptable figure. Further, during operation under RSTP and in response to a failure, MAC addresses need to be flushed and re-learned which is an expensive operation. Consequently, these approaches are not being viewed as carrier-grade technology.

In view of the above, there arises a need to address the drawbacks of the prior art, as is accomplished by the preferred embodiments described below.

BRIEF SUMMARY OF THE INVENTION

A bridged network system is described comprising a plurality of nodes. Each node in the plurality of nodes is coupled to communicate with at least one other node in the plurality of nodes. The plurality of nodes comprise a bridge network between external nodes located externally from the plurality of nodes. Each node of the plurality of nodes is operable to perform the steps of receiving a packet, wherein the packet comprises a route indicator field, and responsive to the packet being received prior to a time of failure along a communication link between two of the plurality of nodes, transmitting the packet along a first route in the system to another node in the plurality of nodes. Conversely, each node of the plurality of nodes is also operable to perform the step of, responsive to the packet being received after a time of failure along a communication link between two of the plurality of nodes and in response to the route indicator field, transmitting the packet along a second route in the system to another node in the plurality of nodes, wherein the second route differs from the first route and is identified prior to the time of failure.

Other aspects are also described and claimed.

DETAILED DESCRIPTION OF THE INVENTION

Figure 1A:
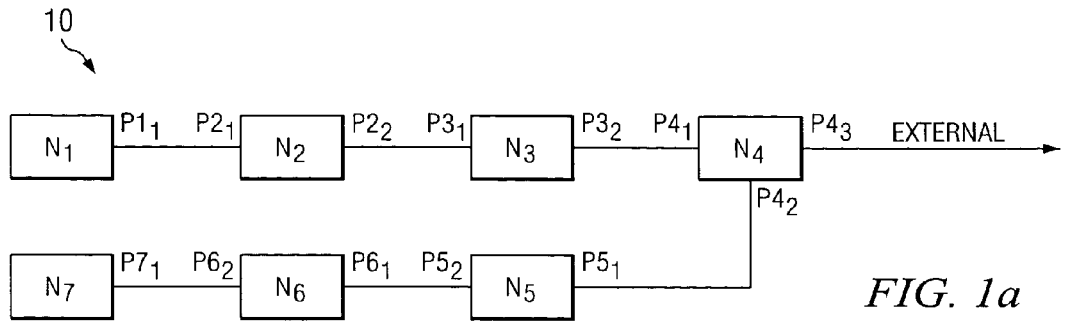
FIG. 1a illustrates a block diagram of a system 10 into which a preferred embodiment may be implemented.

FIG. 1a illustrates a block diagram of a system 10 into which the preferred embodiments may be implemented. System 10 generally represents a bridged network such as an Ethernet network and that includes a number of network nodes $N_1$ through $N_7$. Such nodes are sometimes described as edge nodes or core nodes based on their location in the network. Edge nodes are so named as they provide a link to one or more nodes outside of the Ethernet network and, hence, logically they are located at the edge of the network, whereas core nodes are inside the edges defined by the logically perimeter-located edge nodes. An Ethernet network is often a publicly accessible network that provides a common domain, typically under the control of a single administrator, such as an Internet Service Provider ("ISP"). Ethernet may be used to connect to the global Internet and to connect between geographically separated sites, such as between different locations of a business entity. Also, the Ethernet network is often shared among different customer virtual local area networks ("VLAN"), where these networks are so named because a first VLAN is unaware of the shared use of the Ethernet network by one or more additional VLANs. In this manner, long-standing technologies and infrastructures may be used to facilitate efficient data transfer.

Nodes $N_1$ through $N_7$ include various aspects as known in the art, such as operating to send a packet as a source or to receive a packet as a destination. Further, and as also known in the art, system 10 is typically coupled with stations or nodes external from system 10, such as may be implemented in the global Internet or at remotely located networks, such as at different physical locations of a business entity. These external nodes can communicate packets with system 10. For example, one such node external from, but coupled to, node $N_1$ may thereby communicate a packet to node $N_1$. In this example, since the packet enters the domain of system 10 through node $N_1$, then node $N_1$ is referred to as an ingress node. Further, once that packet is so received, it may be forwarded on through various paths of system 10, and ultimately it will reach one of the other nodes and then may pass outward of system 10. For example, the packet may reach node $N_4$, which may then communicate that packet also external with respect to system 10, by transmitting the packet onward via a link from node $N_4$ to such an external node. In this way, since the packet exits the domain of system 10 through node $N_4$, then node $N_4$ is referred to as an egress node. One skilled in the art should appreciate that the number of nodes shown in FIG. 1a is solely by way of example and to simplify the illustration and example, where in reality system 10 may include any number of such nodes. Further, one skilled in the art should also appreciate that each such node may be readily constructed and programmed using to various hardware/software/firmware to provide the operation and functionality described in this document.

In one aspect of a preferred embodiment, system 10 operates according to a known spanning tree protocol, such as the above-introduced RSTP. Toward this end, in FIG. 1a, a number of logical links are shown in system 10 as solid lines between various nodes, connecting various of the nodes to one another for the sake of routing packets along such links. The logical links in their entirety form a spanning tree among the nodes, that is, a defined connectivity for packet flow. More specifically, according to the RSTP, during the operation of system 10 and according to known IEEE standards, control messages are exchanged between each node to one of the nodes which is designated as the root. Further during this process, each node establishes its own forwarding table, where that table indicates to the respective node that for a packet received on a given port for the node, the node is then to route the packet to a corresponding port based on the destination MAC address in the packet. Accordingly, with each node having such a forwarding table, a logical link is established from that node to at least one other node, thereby giving rise to the illustration of logical links in FIG. 1a. Further in this regard, in FIG. 1a, each node is shown to have at least one port, and for sake of convention each such port is labeled with the letter "P" and is followed by a number corresponding to the same node. For example, node $N_1$ has a port $P1_x$. The subscript "x" for each such node is added to distinguish multiple ports at the same node. For example, node $N_1$ only has one port and, thus, it is labeled port $P1_1$, while node $N_2$ has two ports, $P2_1$ and $P2_2$. Given the spanning tree logical links and the preceding conventions, then the connectivity in FIG. 1a is as shown in the following Table 1:

TABLE 1

| Node | connected to | by port |
|---|---|---|
| $N_1$ | $N_2$ | $P1_1$ |
| $N_2$ | $N_1$ | $P2_1$ |
| $N_2$ | $N_3$ | $P2_2$ |
| $N_3$ | $N_2$ | $P3_1$ |
| $N_3$ | $N_4$ | $P3_2$ |
| $N_4$ | $N_3$ | $P4_1$ |
| $N_4$ | $N_5$ | $P4_2$ |
| $N_5$ | $N_4$ | $P5_1$ |
| $N_5$ | $N_6$ | $P5_2$ |
| $N_6$ | $N_5$ | $P6_1$ |
| $N_6$ | $N_7$ | $P6_2$ |
| $N_7$ | $N_6$ | $P7_1$ |

Note that Table 1 is provided to demonstrate the connections in FIG. 1a, but it is not intended to represent an actual forwarding database or forwarding table maintained by any particular node in system 10.

Given the preceding and under a preferred embodiment, when no network failure has occurred for system 10, then each node consults its respective forwarding table to route packets in a typical spanning tree fashion. As an example, assume that node $N_2$ receives a packet that has a destination MAC address to a node that is external from and connected to node $N_4$. In other words, in the example, node $N_4$ is considered an egress node in that the packet will exit the domain defined by system 10 by being transmitted outward from that domain via node $N_4$. Returning to node $N_2$, it consults its forwarding table to determine, based on the destination MAC address in the packet, the port of node $N_2$ on which the packet should be transmitted. Given the spanning tree logical links shown in FIG. 1 and Table 1, node $N_2$ will determine that its port $P2_2$ provides a connection toward the destination MAC address and, hence, node $N_2$ thereby transmits the received packet via that port. Continuing with this example, the transmitted packet will then be received by node $N_3$ at its port $P3_1$. Node $N_3$ then consults its forwarding table, to determine a transmit port that corresponds to the destination address in the packet, which recall is a destination that is external from node $N_4$. Accordingly, node $N_3$ identifies its port $P3_2$ as the desired port, and it transmits the packet via that port. Completing the example, node $N_4$ then receives, via its port $P4_1$, the packet from node $N_3$. From the destination address in the packet, node $N_4$ determines from its forwarding table that its port $P4_3$ provides connectivity toward the destination node (not shown) and, hence, node $N_4$ transmits the packet outward from its port $P4_3$.

If system 10 were implemented according to the prior art, then upon a failure of one of the links in FIG. 1a, then a dynamic and automated technique is performed whereby a new spanning tree is defined among its various nodes. Particularly, in such a case, additional control messages are communicated among the various nodes so as to identify the failed link and to establish a new spanning tree. During this transition time, each node is required to flush information out of its respective forwarding table, and in response to the new control messages each forwarding table is re-built, which is sometimes referred to as a re-learn procedure. When the forwarding table is complete for each node, the system is said to have re-converged to a new spanning tree. As discussed earlier in the Background Of The Invention section of this document, however, this procedure takes time, and in some implementations may be disadvantageous or even prohibitive. Accordingly, the following discussion demonstrates how system 10, according to one preferred embodiment, provides an alternative manner of responding to a link failure and that improves upon drawbacks of the current state of the art.

Figure 2:
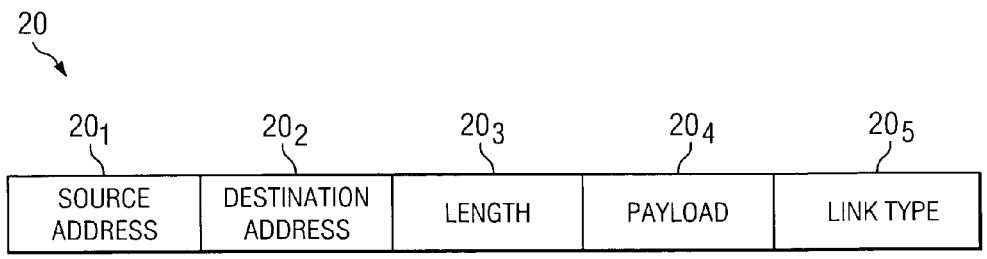
FIG. 2 illustrates a packet format 20 according to the preferred embodiment of FIGS. 1a through 1c.

FIG. 2 illustrates a packet format 20 according to a preferred embodiment and for use in connection with system 10 of FIG. 1a. Packet format 20 includes various fields as known in the Ethernet art, and only some of which are shown by way of example. These fields include a source address field $20_1$, a destination address field $20_2$, a length field $20_3$ and a data payload field $20_4$. Other fields, although not shown, may be included as also known in the art, such as a preamble and a packet (or frame) start field. According to the preferred embodiment, however, packet format 20 includes an additional field $20_5$, referred to hereafter as a link type field $20_5$. Link type field $20_5$ is so named because, as shown below, the state of the field indicates the type of link on to which the packet is routed, with one state in field $20_5$ (e.g., 0) indicating a spanning tree link and another state in field $20_5$ (e.g., 1) indicating a bypass link along system 10. In the preferred embodiment, link type field $20_5$ is a one-bit field and it is contemplated that it could be a bit provided as an addition to existing Ethernet frames or, alternatively, it could be a bit that is already in the Ethernet frame yet where the function of that bit is changed to be consistent with the functionality described in this document as relating to link type field $20_5$. In either event, and for reasons more clear below, note that link type field $20_5$ is only needed to serve a function within the domain of system 10 and, thus, if desirable, that field may be stripped from packet format 20 prior to transmitting the packet externally from system 10.

Figure 1B:
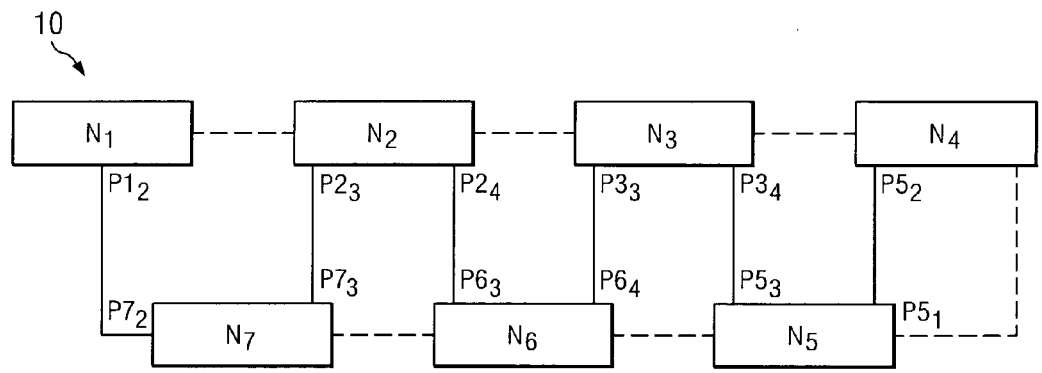
FIG. 1b illustrates system 10, but with an additional set of logic links between the system nodes and to be used to route packets in a bypass mode.

FIG. 1b returns to an illustration of system 10, but for reasons more clear below it illustrates a set of logic links between the system nodes and to be used when link type field $20_5$ of FIG. 2 is set to the bypass mode, where these logic links are shown with solid lines between various nodes. For the sake of later reference, each solid line link between two nodes in FIG. 1b is referred to as a bypass link. Also, for sake of contrast, the spanning tree logic links of FIG. 1a are also shown in FIG. 1b, but they are shown using dashed lines to distinguish then from the bypass links of FIG. 1b. In general and as shown below, each bypass link may provide a backup or bypass function in the event of a failure of a spanning tree link. The specific connectivity of the bypass links of FIG. 1b are as shown in the following Table 2:

TABLE 2

| node | connected to | by port |
|---|---|---|
| $N_1$ | $N_7$ | $P1_2$ |
| $N_2$ | $N_7$ | $P2_3$ |
| $N_2$ | $N_6$ | $P2_4$ |
| $N_3$ | $N_6$ | $P3_3$ |
| $N_3$ | $N_5$ | $P3_4$ |
| $N_4$ | $N_5$ | $P4_2$ |
| $N_5$ | $N_4$ | $P5_1$ |
| $N_5$ | $N_3$ | $P5_3$ |
| $N_6$ | $N_3$ | $P6_4$ |
| $N_6$ | $N_2$ | $P6_3$ |
| $N_7$ | $N_2$ | $P7_3$ |
| $N_7$ | $N_1$ | $P7_2$ |

In one preferred embodiment, the bypass links of system 10, such as those shown in Table 2, are established statically given knowledge of the network topology and preferably before a link failure occurs. More particularly, for each node, a table referred to herein as a bypass table is created, and static port to port information is provided in that table for purposes of routing packets along the bypass links. For example with respect to node $N_6$, its bypass table correlates its port $P6_3$ with its port $P6_4$ when bypass communications are to occur, that is, for a packet received by node $N_6$ at port $P6_3$, it is to be transmitted by node $N_6$ via port $P6_4$. For reasons further discussed later, given such an association, if the node receives a packet of one of these two associated ports and the packet is indicated to be routed via a bypass link, then the packet is then transmitted by the node out of the other and associated node, without reference to the destination MAC address in the packet. In the current example, therefore, and unlike the prior art forwarding table used in a spanning tree network and which associates an outgoing port with an in-packet destination MAC address, in the preferred embodiment the bypass table associates two ports at the same node. As a final observation, note in the example of FIG. 1b that many of the protection links are defined so that a path is created across two bypass links that permits a packet to be routed around a single spanning tree logical link. For example, for the spanning tree logical link between nodes $N_1$ and $N_2$, there is an alternative path defined by a first bypass link from node $N_1$ to node $N_7$ and a second bypass link from node $N_7$ to node $N_2$. As another example, for the spanning tree logical link between nodes $N_2$ and $N_3$, there is an alternative path defined by a first bypass link from node $N_2$ to node $N_6$ and a second bypass link from node $N_6$ to node $N_3$. Other examples, as well as the operation with respect to these paths, will be further appreciated from the remaining discussion.

The operation of system 10 according to one preferred embodiment is now described with reference to both FIGS. 1a and 1b. By way of introduction, recall that packets may be routed in system 10 along a spanning tree link or along a bypass link, where recall also that the destination is preferably triggered in part by the link type field $20_5$ introduced above in connection with FIG. 2. Each of these alternatives is discussed below.

When packets are routed to the spanning tree links in system 10, system 10 operates according to known spanning tree operation, with the exception that each packet also includes a link type field $20_5$ set to a state (e.g., 0) that thereby indicates that the packet is to be routed to a spanning tree link. Accordingly, as any node in system 10 receives such a packet, it routes the packet according to spanning tree operation. Thus, each node in system 10 that receives a packet designated for a spanning tree link consults its forwarding table to determine which port is associated with the external destination MAC address shown in the destination address field $20_2$ of the packet. For sake of later comparison, this association is as shown as the following Association 1:

external destination MAC address→transmit port     Association 1

Following the look up of Association 1, then the node transmits the packet via the indicated transmit port to the next spanning tree link. In other words, under such operation, packets are routed along the links shown in FIG. 1a. For example, assume that node $N_2$ receives, at port $P2_1$ as a receipt port, a packet with an external destination MAC address that is external from and accessible via node $N_5$. In response, node $N_2$ locates in its forwarding table the port that corresponds to the external destination address that is external from and accessible via node $N_5$; as shown in FIG. 1a, in this case the transmit port is port $P2_2$. Accordingly, node $N_2$ transmits the packet via its port $P2_2$ as a transmit port and thereby transmits the packet outward via that port.

When a failure occurs in a link in system 10, that failure is detected according to known protocols. However, as an enhancement in a preferred embodiment, in response to the failure detection, a node within system 10 changes the state of link type field $20_5$ so that each packet so changed will be routed along a bypass link, where recall by way of example that a binary value of 1 in link type field $20_5$ causes this effect. Further, when a node within system 10 receives a packet with a binary value of 1 in its link type field $20_5$, the receiving node does not consult its forwarding table for purposes of further routing the received packet, but instead it consults its bypass table to determine the next route for the received packet. As an illustration of the preceding, for such a bypass-designated packet, its route is no longer according to the spanning tree links as illustrated generally in FIG. 1a, but instead it is according to the bypass links as illustrated generally in FIG. 1b. Thus, as an example, assume in FIG. 1a that a failure occurs in the spanning tree logical link between nodes $N_2$ and $N_3$, and consider once more the example of a packet that was intended to traverse system 10 from node $N_2$ and with a destination address to a node that is connected externally with respect to node $N_4$. In the prior art, such a failure would be responded to by nodes immediately flushing their respective forwarding tables, with a delay or drop in packet transmission as the network would re-converge on a new spanning tree. In contrast, however, according to one preferred embodiment, in such a case, the nodes adjacent the failure become quickly aware of the failure (through known protocol) and they are able to mark any received packet with a value of 1 (i.e., bypass) in link type field $20_5$ of the packet. For example, assume that node $N_2$ receives a packet via a spanning tree link on its port $P2_1$ while at the same time node $N_2$ has notice of a failure in the adjacent spanning tree link between nodes $N_2$ and $N_3$. In response, response, node $N_2$ changes the state of link type field $20_5$ in the received packet from a value of 0 to a value of 1; at the same time, note in the preferred embodiment that node $N_2$, as a node adjacent the failure, delays the flushing of addresses in its forwarding table because otherwise it will have to broadcast. In an alternative approach, however, a node prior to one adjacent the failure, such as node $N_1$ in the present case, may change the state of link type field $20_5$ in a received packet from a value of 0 to a value of 1, in which case the delayed flushing is not required. In any event, returning to the present example and with type field $20_5$ now set to a value of 1, node $N_2$ consults its bypass table to determine, for the packet now in the bypass mode, the appropriate transmit port. In other words, the association of the bypass table is as shown in the following Association 2:

receipt port→transmit port                    Association 2

With respect to the actual association result for the present example, FIG. 1b indicates the two possibilities in this case, namely, ports $P2_3$ and $P2_4$; assume further in the present example that the bypass table indicates a transmit port of $P2_4$ for a receipt port of $P2_1$. Accordingly, in the present example, node $N_2$ transmits the packet along its transmit port $P2_4$, which as seen in FIG. 1b thereby transmits the packet to node $N_6$. Note also in this regard that the transmitted packet is thereby routed away from the spanning tree logical link failure between nodes $N_2$ and $N_3$.

Continuing with a bypass packet as described above, additional considerations are taken in one preferred embodiment when such a packet is received by a node and already has been so designated. In other words, in the preceding discussion, node $N_2$ was the first node to mark the packet as a bypass packet (i.e., by changing the state of link type field $20_5$ from 0 for a spanning tree link to 1 for a bypass link), and that packet was forwarded to a next node, which in the example is node $N_6$. The next receiving node, therefore, receives the packet as already being indicated as a bypass packet. In the present example, this is node $N_6$. In response to receiving a packet with a link type field $20_5$ set to 1, the receiving node (e.g., node $N_6$) consults its bypass table. Also in this regard, in one preferred embodiment the bypass table for each node includes sufficient information so that such a receiving node may determine based on its receipt port the location of the failed link and whether the receiving node is adjacent (i.e., directly connected to) the failed link; in the present example, therefore, node $N_6$ may determine, from receiving a bypass packet on its port $P6_3$, that the corresponding spanning tree link that has failed is the spanning tree logical link between nodes $N_2$ and $N_3$. Further, node $N_6$, from its bypass table, is informed that it is not adjacent this link. In response, node $N_6$ identifies a transmit port corresponding to the port at which the node received the packet (i.e., the receipt port), and node $N_6$ transmits the bypass packet via that transmit port; in the present example, assume for a receipt port of $P6_3$ that the corresponding transmit port is port $P6_4$. Thus, the packet is transmitted by node $N_6$ via port $P6_4$ to node $N_3$.

Continuing with a bypass packet as described above, additional considerations are taken in the preferred embodiment when such a packet is received by a node and already has been so designated, and further where the receiving node is adjacent the failed link. Continuing then with the preceding example, recall that a failure occurred in a spanning tree link between nodes $N_2$ and $N_3$, node $N_2$ changed link type field $20_5$ in the packet to a value of 1, and the packet was routed to node $N_6$ which in response consulted its bypass table (because of the set link type field $20_5$) and routed the packet to node $N_3$.

Node $N_3$, therefore, represents a node that receives a bypass packet and that is adjacent (i.e., directly connected to) a link failure. According to one preferred embodiment, the response of such a node may be one of two approaches. In a first approach, the node changes the stated of the link type field $20_5$ of the packet back to a value (e.g., 0) that will cause the packet thereafter to be routed in a manner comparable to the prior art spanning tree protocol. Further in this case, the node operates according to the spanning tree protocol by consulting its forwarding table, thereby transmitting the packet further through system 10 at a transmit port that corresponds to the external destination address in the field $20_2$ of the packet (i.e., Association 1). In the present example, therefore, node $N_3$ determines, as shown in the spanning tree logical link in FIG. 1a, that the packet is to be transmitted via its port $P3_2$. Also, after the packet transmission by node $N_3$, and assuming no additional link failures, then the packet will be processed using the same procedures and rules as used in the prior art RSTP. Further, note that if the forwarding table at node $N_3$ already has been flushed due to the already-detected failure between nodes $N_2$ and $N_3$, then packets are being broadcast exactly as mandated by the RSTP. Note also from the preceding that this first approach therefore requires that a receiving node have knowledge that it is adjacent the already-detected spanning tree logical link failure. In an alternative and second approach, however, after a packet has been indicated as a bypass link packet, then that status may remain in effect as the packet traverses the remainder of its path in the domain illustrated by system 10. Thus, in the present example and again considering node $N_3$ receiving a packet with a link type field $20_5$ set to 1, then the node consults its bypass table and transmits the packet via the transmit port that corresponds to the receipt port (i.e., Association 2). In the bypass route shown in FIG. 1b, therefore, node $N_3$ determines that it received the packet at receipt port $P3_3$ and its bypass table indicates a corresponding transmit port of port $P3_4$. Thus, node $N_3$ transmits the packet along port $P3_4$ to node $N_5$, which receives the packet at its receipt port $P5_3$. Completing the second and alternative approach, node $N_5$ therefore also receives a packet with a link type field $20_3$ set to 1, and in response node $N_5$ consults its bypass table. Accordingly, the bypass table correlates the receipt port $P5_3$ with the transmit port $P5_1$, so node $N_5$ then transmits the packet to node $N_4$, which is the egress node for the domain represented by system 10. Note also that in the preferred embodiment, node $N_4$, as the egress node, removes link type field $20_5$ from the packet as that field is not needed once the packet exits the domain of system 10.

According to a preferred embodiment as has been described, two post-failure-detection alternatives are contemplated: (1) in one a packet is only partially routed as a bypass link packet within system 10 until the packet is beyond the location of the failure; (2) in another the packet is fully routed as a bypass link packet within system 10 until an egress node is reached. In either case, as either of these alternatives is routing packets, it is further contemplated that system 10 uses a protocol, such as a known protocol, to re-converge to a new spanning tree that contemplates isolating the detected existing failure. Note, however, that this re-convergence time does not significantly delay or drop packets as is the case in the prior art because packet transmissions are permitted to occur simultaneously with the re-convergence to a new spanning tree. Further, once the new spanning tree is fully converged, then each packet may be returned to a spanning tree link designation in its link type field $20_5$, unless of course a failure occurs in a logical link of the new spanning tree, in which case the above-described preferred embodiment may be implemented in connection with the failure of the newer spanning tree. Lastly, note that during re-convergence there is the possibility of a loop, that is, the transmission of a packet to the same node according to both techniques, that is, one along a spanning tree link and one along a bypass link, where both of these packets may then be received by a destination node within system 10. However, further due to the preferred embodiment, such packets will have differing values in the respective link type field $20_5$ of each such packet, thereby making them distinguishable and resolvable at the receiving node.

Figure 1C:
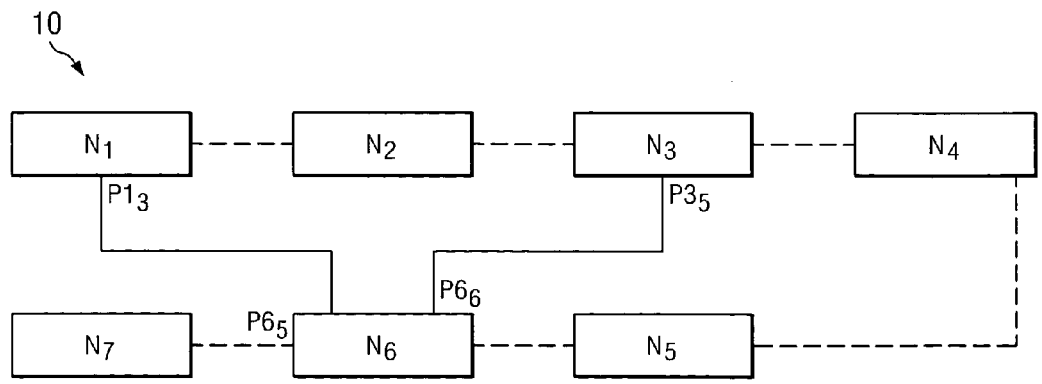
FIG. 1c illustrates the flexibility of a preferred embodiment in permitting a bypass path to route beyond a single spanning tree link.

FIG. 1c illustrates an additional aspect of flexibility of the preferred embodiment and once again depicts system 10. However, in FIG. 1c, an alternative set of bypass logic links are shown to demonstrate that the preferred embodiment is not limited to protecting a single spanning tree logical link with two bypass links. Also, for sake of contrast, the logic links of FIG. 1a are also shown in FIG. 1c, but they are shown using dashed lines to distinguish the from the bypass links of FIG. 1c. The specific connectivity of the bypass links of FIG. 1c are as shown in the following Table 3:

TABLE 3

| node | connected to | by port |
|------|--------------|---------|
| $N_1$ | $N_6$ | $P1_3$ |
| $N_6$ | $N_1$ | $P6_5$ |
| $N_6$ | $N_3$ | $P6_6$ |

From FIG. 1c and Table 3, one skilled in the art will appreciate that backup links can be provided not only to protect a single spanning tree link, but also a series of spanning tree links, depending on whether the network nodes can support this operation. For example, FIG. 1c illustrates an example where the bypass links are provided to protect the combination of spanning tree links from node $N_1$, to node $N_2$, to node $N_3$. Hence, the preferred embodiment may be used to open backup paths over parts of the network to provided added security and can be implemented and provided separately.

As another observation with respect to the preferred embodiment as demonstrated in FIGS. 1a and 1b, this approach may be used to emulate 1+1 and 1:1 protection for certain applications. More specifically, in the case of 1+1 protection, there is required two live paths; using the preferred embodiment, a primary path may be provided for spanning tree designated packets (i.e., link type field $20_5$ equal to 0) and a secondary path may be concurrently provided by bypass designated packets (i.e., link type field $20_5$ equal to 1), assuming that all the nodes are conformant. Thus, using this approach, frames may be sent on both paths (one set in the solid lines in FIG. 1a, one set in FIG. 1b). Further, in case of a failure, the RSTP mechanism associated with the primary path re-converges and finds another primary path, and then a signaling could indicate to duplicate the frames on the backup paths (for every link). In the case of 1:1, packets are not being sent automatically, however in case there is a need, the backup path can be activated by sending a control frame along the primary RSTP path indicating to the participating nodes to switch to the backup paths.

Figure 3:
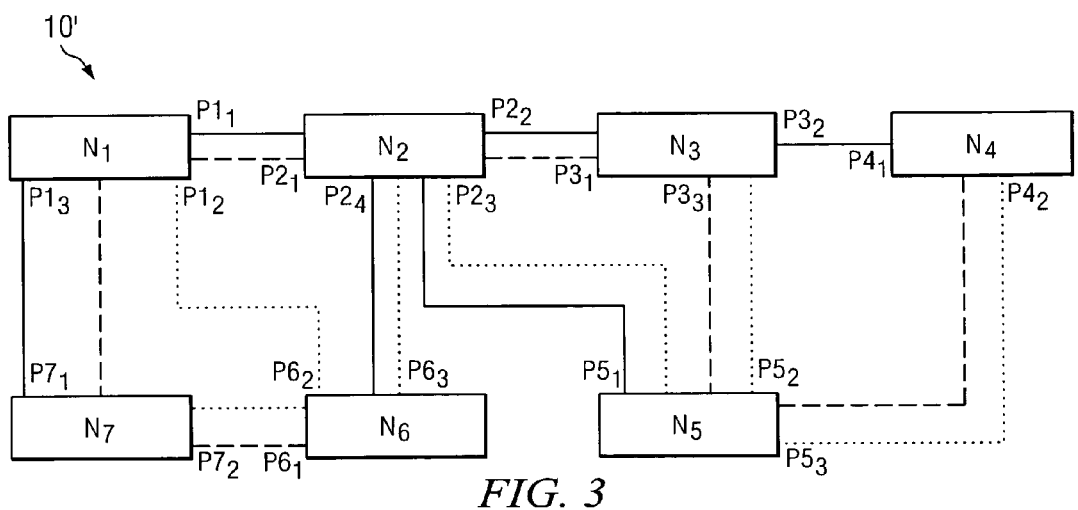
FIG. 3 illustrates a system 10' as an alternative to system 10 described above, where system 10' routes packets across alternative pre-computed sets of logic links.

FIG. 3 illustrates a system 10' as an alternative preferred embodiment to system 10 described above, where system 10' has certain similarities but also differs in various respects as appreciated by one skilled in the art given the following. For sake of presenting a comparable illustration, system 10' includes the same number of nodes $N_1$ through $N_7$ shown above in FIGS. 1a, 1b, and 1c. However, in system 10', a total of three different sets of logic links are shown, where each set is distinguished in the Figure by using a different type of lines. Specifically, a first set of logic links is shown with solid lines between various nodes, a second set of logic links is shown with dashed lines between various nodes, and a third set of logic links is shown with dotted lines between various nodes. The specific connections of each different set are as shown in the following respective Tables 4, 5, and 6:

TABLE 4

(solid line links)

| node | connected to | by port |
|------|--------------|---------|
| $N_1$ | $N_2$ | $P1_1$ |
| $N_1$ | $N_7$ | $P1_3$ |
| $N_2$ | $N_1$ | $P2_1$ |
| $N_2$ | $N_3$ | $P2_2$ |
| $N_2$ | $N_5$ | $P2_3$ |
| $N_2$ | $N_6$ | $P2_4$ |
| $N_3$ | $N_2$ | $P3_1$ |
| $N_3$ | $N_4$ | $P3_2$ |
| $N_4$ | $N_3$ | $P4_1$ |
| $N_5$ | $N_2$ | $P5_1$ |
| $N_6$ | $N_2$ | $P6_3$ |
| $N_7$ | $N_1$ | $P7_1$ |

TABLE 5

(dashed line links)

| node | connected to | by port |
|------|--------------|---------|
| $N_1$ | $N_2$ | $P1_1$ |
| $N_1$ | $N_7$ | $P1_3$ |
| $N_2$ | $N_1$ | $P2_1$ |
| $N_2$ | $N_3$ | $P2_2$ |
| $N_3$ | $N_2$ | $P3_1$ |
| $N_3$ | $N_5$ | $P3_3$ |

TABLE 5-continued (dashed line links)

| node | connected to | by port |
|---|---|---|
| $N_4$ | $N_5$ | $P4_2$ |
| $N_5$ | $N_3$ | $P5_2$ |
| $N_5$ | $N_4$ | $P5_3$ |
| $N_6$ | $N_7$ | $P6_1$ |
| $N_7$ | $N_1$ | $P7_1$ |
| $N_7$ | $N_6$ | $P7_2$ |

TABLE 6

(dotted line links)

| node | connected to | by port |
|---|---|---|
| $N_1$ | $N_6$ | $P1_2$ |
| $N_2$ | $N_6$ | $P2_4$ |
| $N_2$ | $N_5$ | $P2_3$ |
| $N_3$ | $N_5$ | $P3_3$ |
| $N_4$ | $N_5$ | $P4_2$ |
| $N_5$ | $N_2$ | $P5_1$ |
| $N_5$ | $N_3$ | $P5_2$ |
| $N_5$ | $N_4$ | $P5_3$ |
| $N_6$ | $N_7$ | $P6_1$ |
| $N_6$ | $N_1$ | $P6_2$ |
| $N_6$ | $N_2$ | $P6_3$ |
| $N_7$ | $N_6$ | $P7_2$ |

In general, each set of paths alone is comparable in some respects to a prior art spanning tree; however, collectively and individually the paths in FIG. 3 are distinguishable from the prior art for various reasons, some of which are also detailed later. As one distinction, in the preferred embodiment, each different set of links in system 10' is identified (i.e., pre-computed) statically given the network topology and prior to the time of a network failure in system 10', where this computation may be manual or automatic and where various algorithms can be used and traffic engineering rules also may be incorporated making this scheme very amenable for Traffic Engineering. Also in connection with a preferred embodiment, preferably the sets in their entirety are link disjoint, that is, no single link between two nodes is served by all sets of connections. Thus, in the example of FIG. 3 where three sets of connections are provided, then no single link between any of the nodes is connected by all three of those sets. Given these preferences, the benefits and operation with respect to the various sets of links are as discussed after the following discussion of a preferred packet format for system 10'.

Figure 4:
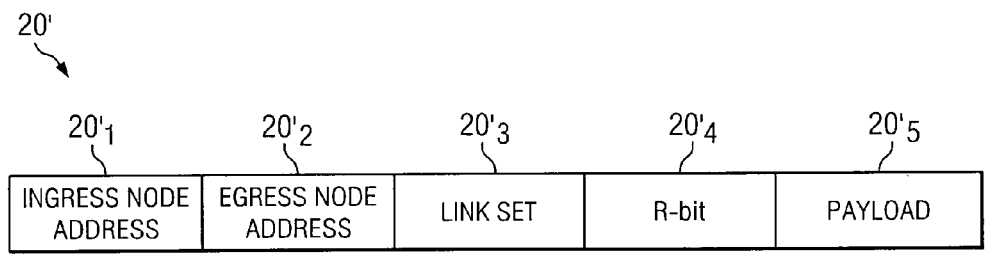
FIG. 4 illustrates a packet format 20' according to the alternative preferred embodiment of FIG. 3.

FIG. 4 illustrates a packet format 20' according to an alternative preferred embodiment and for use in system 10' of FIG. 3. Packet 20' includes five fields. A first field $20'_1$ indicates the address of the ingress edge node in system 10'. Thus, field $20'_1$ identifies the address of the first node in system 10' that encounters packet 20' once packet 20' is provided by an external source to system 10'. A second field $20'_2$ indicates the address of the egress edge node for packet 20'. In this regard, note that Ethernet bridge networks provide sufficient controls such that when a packet is received external from the network, it includes a source and destination address as relating to nodes external from the network; in response and in order to cause the packet ultimately to be directed to the packet-specified destination address, the ingress edge node determines a desired egress edge node within system 10' such that once the packet arrives at that egress node, it can travel onward to the external destination MAC address. According to a preferred embodiment, the ingress edge node locates within packet 20' both its own address, shown as field $20'_1$, as well as the egress edge node address, shown as field $20'_2$.

Continuing with FIG. 4, a third field $20'_3$ is indicated as a link set field. As further detailed below, link set field $20'_3$ is an M-bit field that can specify any one of up to $2^M$ different sets of links in connection with system 10', where each link set represents one of the sets of links in FIG. 3. Further, link set field $20'_3$ could be provided as an addition to existing Ethernet frames or, alternatively, it could be one or more bits that are already in the Ethernet frame yet where the function of that bit or bits is changed to be consistent with the functionality described in this document as relating to link set field $20'_3$. In the present example of system 10' which has three sets of links, then M=2. Accordingly and by example, assume that a setting equal to 00 (binary) in tree field $20'_3$ indicates that the packet is to be routed along the solid line set of links in FIG. 3. Further and as detailed later, a different value in link set field $20'_3$ thereby represents a different set of links in FIG. 3, so to complete the example, assume that a setting equal to 01 (binary) in link set field $20'_3$ indicates that the packet is to be routed along the dashed line set of links in FIG. 3, and assume that a setting equal to 10 (binary) in link set field $20'_3$ indicates that the packet is to be routed along the dotted line set of links in FIG. 3.

Continuing with FIG. 4 and completing the remaining fields, a fourth field $20'_4$ is indicated as an R-bit, which has a state that permits either re-routing or dropping of the packet, as detailed later. Additionally, packet 20' includes a payload field $20'_5$. Payload field $20'_5$ includes the packet as originally transmitted from the node that is external to system 10'. Note, therefore, that this filed $20'_5$ includes the user data as well as the originally-transmitted external source address and destination address, where those addresses are directed to nodes outside of system 10'. Thus, field $20'_5$ includes the same information as discussed in connection with packet 20 of FIG. 2, with the exception of not including link type field $20_5$. Accordingly, packet 20' includes two sets of addresses, one (in field $20'_5$) pertaining to the source and destination node addresses that are external from system 10' and the other (in fields $20'_1$ and $20'_2$) identifying the ingress and egress edge nodes in system 10'. This technique may be referred to as encapsulation or MAC-in-MAC encapsulation in that there is one set of MAC addresses encapsulated within another set of MAC addresses. Lastly, note that when packet 20' reaches its egress edge node $N_x$, that node strips fields $20'_1$, $20'_2$, $20'_3$, and $20'_4$ from the packet and then forwards, to the destination address node in payload field $20'_5$, the remaining payload field $20'_5$ as the entirety of the packet. Thus, upon receipt of the final packet at a node external from system 10', the destination node is unaware of the information previously provided in fields $20'_1$, $20'_2$, $20'_3$, and $20'_4$.

The operation of system 10' of FIG. 3 is now discussed in connection with frame format 20' of FIG. 4. Prior to any failure in any of the link sets in system 10', each different link set is identified as a viable communication path for packets, as set forth above. Thereafter, network communications commence through system 10'. Under normal operating conditions when no failure has been detected in system 10', then each packet will have a same setting in its link set field $20'_3$. This same setting provides an indication that the packet should be routed along a same one of the different sets of links in FIG. 3. For example, assume that a setting equal to 00 in link set field $20'_3$ indicates that the packet is to be routed along the solid line set of links in FIG. 3. Further and as detailed later, a different value in link set field $20'_3$ thereby represents a different set of links in FIG. 3, so to complete the example, assume that a setting equal to 01 in link set field $20'_3$ indicates that the packet is to be routed along the dashed line set of links in FIG. 3, and assume that a setting equal to 10 in link set field $20'_3$ indicates that the packet is to be routed along the dotted line set of links in FIG. 3. Thus, under normal operating conditions and without a link failure in system 10', only a single one of these settings is used, so assume that all packets include a value of 00 in their respective link set field $20'_3$. When a node in system 10' receives such a packet at a receipt port, the node consults a routing table to determine a transmit port for the packet. In a preferred embodiment, this routing table differs in association from both the forwarding table of the spanning tree prior art (i.e., Association 1) and the bypass table of system 10 (i.e., Association 2). Specifically, in system 10', the routing table in a given node identifies, for each different set of links, the other nodes within system 10' that are accessible by each port of the given node. For example, such a table for node $N_1$ preferably represents the following information:

TABLE 7

| link set | accessible node(s) | via port |
|---|---|---|
| 00 | $N_7$ | $P1_3$ |
| 00 | $N_2, N_3, N_4,$ $N_5, N_6$ | $P1_1$ |
| 01 | $N_2, N_3, N_5$ | $P1_1$ |
| 01 | $N_7, N_6$ | $P1_3$ |
| 11 | $N_6, N_7, N_2,$ $N_5, N_3, N_4$ | $P1_2$ |

As shown by way of example in Table 7, the association of the routing table of system 10' is as shown in the following Association 3:

link set and egress node within system 10'→transmit port    Association 3

To further appreciate the operation of system 10' and with respect to Association 3, assume as an example that node $N_1$ receives a packet with its link set field $20'_3$ set to 00. Further, recall from FIG. 4 that in the preferred embodiment of system 10', that packet also will include MAC-in-MAC encapsulation, that is, it will include both the external destination MAC address in payload field $20'_5$, but it also will include the egress node MAC address in field $20'_2$, that is, a destination node within system 10'. Given this information, then node $N_1$ chooses its appropriate transmit port. Continuing then with an example wherein the packet has its link set field $20'_3$ set to 00, assume further that the egress node for the packet is stated in field $20'_2$ to be node $N_5$; accordingly, from Table 7 and Association 3, then node $N_1$ will transmit that packet out its port $P1_1$. This packet will therefore next be received by node $N_2$, and node $N_2$ responds in a comparable manner. Specifically, since the packet still has its link set field $20'_3$ set to 00, then node $N_2$ will consult its own routing table to identify, for link set 00 (i.e., solid lines in FIG. 3), which of its ports may transmit the packet toward node $N_5$, and from FIG. 3 it will be appreciated by one skilled in the art that port $P2_3$ will be so identified. Hence, the packet is transmitted by node $N_2$ to node $N_5$ along link set 00. Next, node $N_5$ will receive the packet from node $N_2$ and determine, from field $20'_2$, that it is the egress node for the packet. Accordingly, node $N_5$ removes fields $20'_1$, $20'_2$, $20'_3$, and $20'_4$ from the packet and then communicates just field $20'_5$, as the entirety of the transmitted packet, to a node external from system 10'. At this point, therefore, the packet has been successfully routed through system 10' and then transmitted to a node external from system 10', which will be unaware of the routing steps and fields that were otherwise used by system 10' for such routing.

Continuing with the operation of system 10', assume next that a failure occurs in one of the illustrated links of FIG. 3. For example, assume that a failure occurs between nodes $N_1$ and $N_2$. Once again using known protocols, the various nodes in system 10' will become aware of the failure. In response, a node may change the setting in link set field $20'_3$ of a packet so as to route the packet around the failure, where the specific node that makes the change is dictated in one preferred embodiment by the state of the bit in R-bit field $20'_4$. Particularly, in one preferred embodiment, when R=0, then only the ingress node in system 10' is permitted to change the setting in link set field $20'_3$, whereas if R=1, then the node adjacent the failure changes the setting in link set field $20'_3$. Note, also, therefore, that if R=0 in a packet received by a node adjacent a failure, and the link set field $20'_3$ of that packet identifies a path that includes the failed link, then the packet will be dropped by the receiving node. Another use of R-bits is to emulate TTL (time-to-live) in the case of multiple switching between the link sets upon multiple link failures (i.e., they determine how many link sets a packet can be switched before the packet is dropped by an intermediate node). In any event, in the present example, assume that R=0. Thus, continuing with the present example, assume that node $N_1$ receives a packet from a node external from system 10'. First, since node $N_1$ is therefore the ingress node in this example, it will append the fields $20'_1$, $20'_2$, $20'_3$, and $20'_4$ to the packet to create the format 20' of FIG. 4. Additionally with respect to field $20'_3$, recall from above that typically a default setting of link set field $20'_3$ equal to 00 is implemented. However, the identified failure between nodes $N_1$ and $N_2$ will be known to node $N_1$, in view of the known network topology, to affect link set 00. Indeed, in this case the link failure affects link set 01 (i.e., the dashed line link between nodes $N_1$ and $N_2$). Accordingly, node $N_1$, as the ingress node and because R=0, sets the state of link set field $20'_3$ to a value that represents a link set that is still completely intact, that is, along which no failure has occurred. In the present example, the only remaining such link set is link set 10 (i.e., the dotted line links in FIG. 3). Thereafter, node $N_1$ routes the packet in the same manner as described above in the example of routing on link set 00, but now this packet is routed along link set 10. Thus, node $N_1$ consults its routing table to identify the Association 3 for the present packet. Assume in the present example that the egress node, as identified in field $20'_2$ of the packet, is node $N_4$. Consequently, node $N_1$ determines that for link set 10, node $N_4$ is accessible via port $P1_2$ and, thus, node $N_1$ uses that port as its transmit port for the packet. Next, node $N_6$ receives the packet, and it too consults its routing table, with reference to the nodes accessible for link set 10; from that analysis, node $N_6$ will identify its port $P6_3$ as a transmit port to node $N_2$. Note, therefore, that node $N_2$ will receive the packet from node $N_6$, thereby having avoided the failure to link sets 00 and 01 between nodes $N_1$ and $N_2$. After $N_2$ receives the packet, it too will consult its routing table with reference to link set 10 and the egress node of $N_4$, thereby transmitting the packet at its transmit port $P2_3$ to node $N_5$. Similarly, node $N_5$ will consult its routing table with reference to link set 10 and the egress node of $N_4$, thereby transmitting the packet at its transmit port $P5_3$ to node $N_4$. Accordingly, node $N_4$, as the egress node and as ascertained from field $20'_2$, removes fields $20'_1$, $20'_2$, $20'_3$, and $20'_4$ from the packet and then communicates just field $20'_5$, as the entirety of the transmitted packet, to a node external from system 10'.

Some additional observations with respect to system 10' are noteworthy. As a first observation, note that when a failure occurs, because each link set is identified prior to that time, then packet communications may be quickly switched to a different link set without awaiting determination of new routing information. As a result and as a second observation, there is not the time expenditure that is required in the prior art RSTP systems where each node is required to flush its forwarding table and then re-learn a new single route. In other words, the routing databases are not corrupted due to a change in link status. As a third observation, while system 10' is shown to include three alternative link sets, any different number of pre-computed link sets may be implemented, where the value of M-bits in field 20'$_3$ is adjusted to accommodate the total number of such sets. As a fourth observation, like system 10 described earlier, system 10' also may emulate 1+1 and 1:1 protection for certain applications. As a fifth observation, note that in the prior art there is a protocol identified by the name Multiple Spanning Trees (i.e., 802.1s), where there are multiple spanning trees, but no switching between them is possible because a VLAN can be registered on only one spanning tree and therefore cannot be switched. In contrast, in the preferred embodiments described relative to FIGS. 3 and 4, it is contemplated to have VLAN registered on many different set of links, where each such set is in part comparable to a different spanning tree, but in the preferred embodiment this thereby permits switching between them without re-registration, in contrast to the above-described prior art where such switching is not permitted. As a sixth observation, system 10' is described above as switching traffic to a different link set following a failure along a previous link set. In one approach, however, the previous link set may be established as a default link set that, upon a failure in that set, re-converges using a protocol comparable to that of the prior art, but while that re-convergence is occurring, traffic is already routed along a different link set by changing the value in link set field 20'$_3$ accordingly. Thereafter, when re-convergence is complete, the value in each packet link set field 20'$_3$ may be changed again, now to a value that identifies the newly re-converged link set. In this sense, therefore, some of the additional link sets are pre-configured statically, while the default link set re-converges dynamically after a failure in that link set. As a seventh observation, note that M, that is, the number of bits in link set field 20'$_3$, in one embodiment may be equal to one, whereas above M is shown by way of example as greater than one. In the case when M=1, there are therefore only two different routing link sets and for a general topology it is impossible to find two completely link-disjoint link sets in this regard—however, the instance of M=1 still may be used to provide protection to selected links. As a final observation, note that in lieu of the use of link set 20'$_3$ to indicate the set of links along which packets are to be communicated, a broadcast packet could be sent, indicating to certain nodes, that thereafter all packets are to be communicated along a desired set of links. In other words, this broadcast packet could present to those nodes an identifier in a manner comparable to that described above with respect to the value set forth in link field 20'$_3$. Thus, initially a default set of links could be identified with such a broadcast packet, whereupon all packets are thereafter communicated along that default set of links; thereafter, upon a failure in the default link set, a new broadcast packet would be communicated, indicating an alternative set of links, whereupon all packets are thereafter communicated along that alternative set of links. This process can continue to identify additional sets of links, where those link sets are either newly identified after a link failure (e.g., re-convergence) or for link sets that are pre-computed at a time prior to the failure.

From the above illustrations and description, one skilled in the art should appreciate that the preferred embodiments provide bridged network system in which traffic resiliency is provided by quickly switching traffic to a pre-identified route upon a link failure. Further in this regard, various alternatives have been described, including examples illustrated by systems 10 and 10'. Both of these systems provide a bridged network, wherein upon a failure within the bridged network along a first set of links within the network, traffic is routed to a second and different set of links where the second set is identified either manually or automatically prior to the time of the failure, and where the second set switch is in response at least in part to a route indicator field in the packet. In system 10, the route indicator field is a link type field 20$_5$, operable to indicate that the packet is to continue along a spanning tree route or a bypass route. In system 10', the route indicator field is a link set field 20'$_3$, operable to indicate that the packet is to continue along a first set of links forming a first route, a second set of links forming a second route, and so forth for up to $2^M$ sets of links corresponding to a respective number of $2^M$ routes. In this manner, the time to switch traffic from the first to second path is reduced as compared to the prior art RSTP systems. In the approach of system 10, following the switch to the second set of links, which in that case is a bypass set of links, a third set of links may be established using RSTP protocol, that is, a flush and re-learn may be performed while traffic continues along the second (bypass) set of links. During this re-learn period, traffic is permitted to occur over the bypass links as is achieved by changing the state of a link type field 20$_5$ of the packet and in connection with a bypass table that uses an Association 2 described above. Once the third set of links is established and properly located in the routing tables of the nodes of system 10, packet flow may be routed to the third set of links and a return to the use of Association 1 occurs, thereby leaving the second set as a possible bypass route should the third set of links also experience a failure. In the alternative approach of system 10', a sufficient number of link sets are preferably identified prior to any failure, and after such a failure then packets may be routed to any one of the link sets that is not affected by the failure, where this alternative routing is achieved by changing the state of a link set field 20'$_3$ of the packet and in connection with a routing table that uses an Association 3 described above. Given the preceding, one skilled in the art should appreciate numerous aspects of the present preferred embodiments. Further, while the present embodiments have been described in detail, various substitutions, modifications or alterations could be made to the descriptions set forth above without departing from the inventive scope. For example, the number of nodes or link sets described above may be altered. As another example, the manner of programming the described functionality into the various nodes may be achieved in various different approaches. As still another example with respect to FIG. 4, note that in some instances R-bit field 20'$_4$ may be eliminated in order to achieve a level of flexibility of implementation or it may be optional. In other words, where R-bit field 20'$_4$ is not available, then only switching by the node adjacent to the failed link is allowed in the network, and therefore there is no need for R-bit field 20'$_4$. Still further examples may be ascertained by one skilled in the art. Consequently, the above is intended as illustrative but not exhaustive, and therefore these examples as well as the preceding teachings further demonstrate the inventive scope, as is defined by the following claims.

The invention claimed is:

1. A bridged network system, comprising:
a plurality of nodes;
wherein each node in the plurality of nodes is coupled to communicate with at least one other node in the plurality of nodes;
wherein the plurality of nodes comprise a bridge network between external nodes located externally from the plurality of nodes; and
wherein each node of the plurality of nodes is operable to perform the steps of:
receiving a packet, wherein the packet comprises a route indicator field further comprising one or two bits that indicates a route;
responsive to the packet being received prior to a time of failure along a communication link between two of the plurality of nodes, transmitting the packet along a first route in the system to another node in the plurality of nodes; and
responsive to the packet being received after a time of failure along a communication link between two of the plurality of nodes and in response to a change of state of the one or two bits in the route indicator field to indicate an alternate route should be used as a result of a link failure, accessing an internal bypass table to retrieve a second route and transmitting the packet along the second route in the system to another node in the plurality of nodes, wherein the second route differs from the first route and is stored prior to the time of failure and wherein the change of state of the one or two bits is performed by one of the nodes that is responsible for detecting the link failure and for receiving and transmitting the packet.

2. The bridged network system of claim 1 wherein the packet comprises a first packet and wherein each of the plurality of nodes is further operable to perform the steps of:
determining a third route in the system after the time of failure;
receiving a second packet after the first packet; and
transmitting the second packet along the third route to another node in the plurality of nodes.

3. The bridged network system of claim 2, and further comprising after the step of receiving the second packet and prior to the step of transmitting the second packet, a step of changing a state of the route indicator field to cause transmission to the third route.

4. The bridged network system of claim 3 wherein the step of transmitting the packet along a first route comprises:
identifying a transmit port in the node that corresponds to a destination address in the packet, wherein the destination address corresponds to a node external from the plurality of nodes; and
transmitting the packet via the transmit port to the first route.

5. The bridged network system of claim 4 wherein the step of transmitting the packet along a third route comprises:
identifying a transmit port in the node that corresponds to a destination address in the packet, wherein the destination address corresponds to a node external from the plurality of nodes; and
transmitting the packet via the transmit port to the third route.

6. The bridged network system of claim 2 wherein the receiving step comprises a node, adjacent to a failure in the first route, receiving the second packet.

7. The bridged network system of claim 2, and further comprising after the step of receiving the second packet and prior to the step of transmitting the second packet, a step of setting a value of a route indicator field in the second packet to cause transmission to either the first or second route.

8. The bridged network system of claim 1 wherein the step of transmitting the packet along a second route comprises:
identifying a transmit port in the node that corresponds to a receipt port in the node; and
transmitting the packet via the transmit port to the second route wherein the packet is a data packet.

9. The bridged network system of claim 8 wherein the transmitting step is not responsive to a destination address within the packet.

10. The bridged network system of claim 1 wherein multiple ones of the plurality of nodes are operable to receive and transmit the packet along the second route until the packet reaches an egress node in the plurality of nodes.

11. The bridged network system of claim 10 wherein the transmission by each node in the multiples ones of the plurality of nodes:
identifying a transmit port in the node that corresponds to a receipt port in the node; and
transmitting the packet via the transmit port to the second route.

12. The bridged network system of claim 1:
wherein a first node in the plurality of nodes that receives a packet from a first external node of the external nodes located externally from the plurality of nodes comprises an ingress node;
wherein a second node in the plurality of nodes that is coupled to communicate the packet to a second external node of the external nodes located externally from the plurality of nodes comprises an egress node; and
further comprising a step of, responsive to a node in the plurality of nodes receiving a packet as an ingress node, insetting an address of the ingress node and the egress node into the packet.

13. The bridged network system of claim 12:
wherein the step of transmitting the packet along either the first route or the second route comprises:
identifying a transmit port in the node that corresponds to the address of the egress node in the packet; and
transmitting the packet via the transmit port to either the first or second route.

14. The bridged network system of claim 13 wherein the step of transmitting the packet along either the first route or the second route is further responsive to the route indicator field in the packet to cause transmission to either the first route or the second route, respectively.

15. The bridged network system of claim 14 wherein the packet further comprises a field for indicating allowability of an ingress node or a node adjacent a failure to change a state in the route indicator field.

16. The bridged network system of claim 12 wherein the first route and the second route are routes in a plurality of different routes, wherein each route in the plurality of different routes is identified prior to the time of failure.

17. The bridged network system of claim 16 wherein each route in the plurality of different routes is identified by a corresponding and different value in the route indicator field.

18. The bridged network system of claim 16 wherein the packet further comprises a VLAN identifier field operable to identify each different route in the plurality of routes so as to facilitate a broadcast message to all nodes on an identified route.

19. The bridged network system of claim 18 wherein the VLAN identifier field facilitates registration of selected different routes in the plurality of routes.

20. The bridged network system of claim 16 wherein the packet comprises a first packet and wherein each node of the plurality of nodes is further operable to perform the steps of:
   determining a third route in the system after the time of failure;
   receiving a second packet after the first packet; and
   transmitting the second packet along the third route to another node in the plurality of nodes.

* * * * *